United States Patent [19]

McNeil

[11] Patent Number: 4,638,544
[45] Date of Patent: Jan. 27, 1987

[54] PLASTIC COVERED FASTENING DEVICE AND METHOD OF ASSEMBLY

[75] Inventor: James E. McNeil, Santa Barbara, Calif.

[73] Assignee: General Motors Corporation, Detroit, Mich.

[21] Appl. No.: 806,636

[22] Filed: Dec. 9, 1985

[51] Int. Cl.$^4$ .............................................. E05D 5/10
[52] U.S. Cl. ........................................ 29/434; 29/450; 29/452; 29/11; 16/DIG. 42
[58] Field of Search ........ 16/273, DIG. 27, DIG. 42; 29/11, 434, 446, 450, 452

[56] References Cited
U.S. PATENT DOCUMENTS 3,921,225  11/1975  Suska ................................... 16/273
4,353,146  10/1982  Brouhaus ............................. 16/273

Primary Examiner—Howard N. Goldberg
Assistant Examiner—Timothy V. Eley
Attorney, Agent, or Firm—Arthur N. Krein

[57] ABSTRACT

A plastic covered fastening device and method of assembly wherein a rigid pin is first inserted into an elongated tube made of a resilient, plastic type material with memory, the tube then being stretched by an axial tension force to reduce its external diameter during installation of the tube and pin into coaxial apertures provided in a pair of elements to be operatively secured to each other, the tension on the tubing then being so that the pin is held firmly in place in one of the apertures as the tubing expands, excess tubing then being removed, as by cutting, at opposite ends of the pin.

5 Claims, 4 Drawing Figures

4,638,544

PLASTIC COVERED FASTENING DEVICE AND METHOD OF ASSEMBLY

FIELD OF THE INVENTION

This invention relates to fastening devices and, in particular, to a plastic covered fastening device and to the method of assembling the same.

DESCRIPTION OF THE PRIOR ART

It is well known to use a fastening device such as a pin as a means to secure one member to another member so as to secure, for example, a pivotal arm to the spaced apart arms of a bifurcated support member in a manner whereby the pin extends through and is fixed to the apertured arms of the support member while loosely extending through an aperture in the pivotal arm. Normally, in such an arrangement, at least one of the apertures in the arms is sized relative to the pin whereby the pin is axially retained after assembly as by a press fit of the pin in that aperture.

SUMMARY OF THE INVENTION

The present invention relates to a plastic covered fastening device and its method of assembly wherein a rigid retainer pin is first inserted into a relatively long piece of resilient, plastic tubing and then, in order to insert the now resilient, plastic type material covered retainer pin through one or more apertures in, for example, a support member and a second member, the opposite ends of the tube are pulled under sufficient tension so as to effect a reduction of the external diameter of the tubing around the retainer pin whereby the tubing and retainer pin can be assembled into the apertures, after which the tension on the tubing is released to allow the tubing to return toward its nominal outside diameter so as to fix the retainer pin in at least one of the apertures and thereafter, the tubing is then cut off at opposite ends of the retainer pin.

It is therefore a primary object of this invention to provide an improved fastening device wherein a rigid retainer pin is encircled by a portion of a tube, of resilient, plastic like material which is then stretched and inserted through a pinning hole until the retainer pin is received into the pinning hole after which tension on the tube is released and then the tube is cut off at opposite ends of the retainer pin which is then fixed in the pinning hole by the forces exerted by the tube after tension is released.

Another object of the invention is to provide an improved method for securing a fastener, such as a pin type fastener, into an apertured workpiece wherein the pin is inserted into a tube of resilient, plastic material, the tube then being elongated by the application of axial tension forces at opposite ends of the tube so that the combined pin and tube outer diameter, when elongated, is less than the internal diameter of the hole in the apertured workpiece so that the pin and tube can be inserted into the hole, after which the tension on the tube is released so that the tube can expand radially to fix the pin in the hole and then the tube is cut off on opposite ends of the pin.

For a better understanding of the invention as well as other objects and further features thereof, reference is had to the following detailed description of the invention to be read in connection with the accompanying drawings.

DESCRIPTION OF A PREFERRED EMBODIMENT

Figure 1:
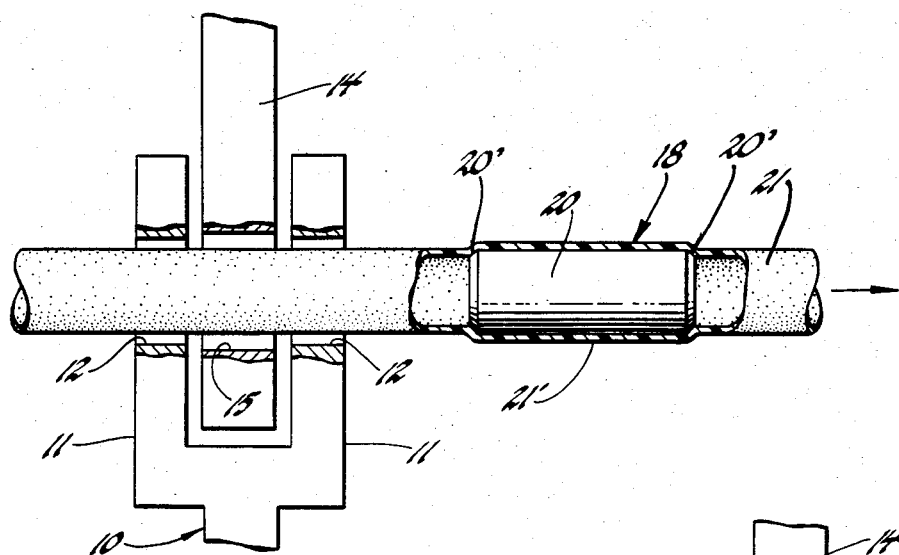
FIGS. 1 to 3 are sequential views showing the steps for securing an apertured lever to an apertured workpiece by means of a plastic covered fastening device, with parts broken away; and, FIG. 4 is a view of the assembled workpiece, lever and plastic covered fastening device, with parts broken away.

As an example only, a plastic covered fastening device and the method of assembly thereof in accordance with the invention will be described with reference to the assembly of an apertured pivotable lever to an apertured workpiece.

As shown in the drawings, the workpiece 10, only a portion of which is shown, is provided with a bifurcated end portion or device portion defining a pair of spaced apart arms 11 which extend upward, with reference to the drawings, from the main body portion of the workpiece 10. As shown, each arm 11 is provided with a through aperture or hole 12 of a predetermined internal diameter that is coaxially aligned with each other. The lever 14, which, in the arrangement shown, is to be pivotably secured to the workpiece 10 in operative position between the arms 11 thereof, as shown in FIG. 4, is provided with a through aperture or hole 15 of a predetermined internal diameter, that is suitably greater than the internal diameter of the holes 12 in arms 11.

Figure 4:
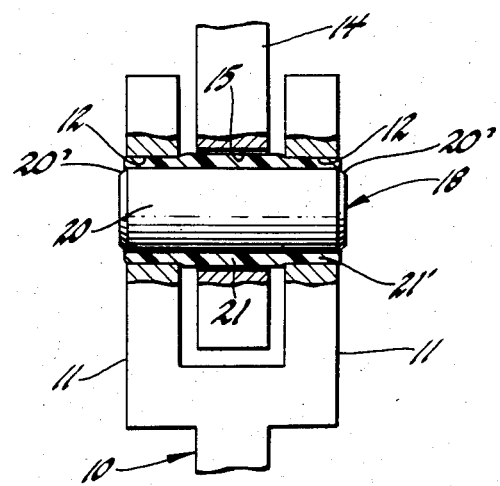

As shown in FIG. 4, the lever 14 is operatively secured to the arms 11 of the workpiece 10 for pivotable movement by means of a plastic covered fastening device, generally designated 18 in FIG. 4, which, in the embodiment illustrated, includes a rigid pin 20 encircled by a sleeve 21' of resilient material retained in the holes 12 in the arms 11 of the workpiece in a manner to be described hereinafter.

The pin 20, made of a suitable hard material, in the embodiment shown is of a suitable axial extent comparable to the distance between the outboard surfaces of the arms 11 and is of a predetermined external diameter that is substantially less than the internal diameter of the holes 12 in arms 11. Preferably, as shown, opposite ends of the pin 20 are suitably chamfered as at 20'.

Now in accordance with a feature of the invention, the pin 20 is first inserted into an elongated piece of tubing or tube 21 of a predetermined nominal external diameter, complimentary to the internal diameter of the holes 12, made of a suitable resilient, plastic like material such as, by way of examples only, a latex synthetic rubber or plastic material such as used in so-called Surgical Tubing, Teflon, Delrin or PVC material. Teflon is a tetrafluoroethylene polymer made by the C. I. du Pont de Nemours, & Co., Inc. of Wilmington, Del. Delrin is a homopolymer acetal resin made by the E. I. du Pont de Nemours, & Co., Inc., Parkersburg, W. Va.

The term resilient, plastic like material or simply the terms plastic has been used herein to describe an elastomeric type material that is resilient and has a so-called plastic memory, so that upon deformation of the material by a force less than the elastic limit of the material, the material will tend to return to its normal or nominal shape and size.

PVC is a well know polyvinyl chloride material commercially available from a number of chemical manufacturers.

The external diameter of the pin 20 and the internal diameter of the tube 20 can be selected so that the pin 20 will initially fit relatively loosely inside the tube 21 or the pin 20 can have a slight tight fit inside of the tube to cause a swelling of the tube 21 around the pin 20. With a loose pin 20 fit within the tube 21, the tube 21 could be of a sufficiently large nominal external diameter so as to require an end thereof to be cut at an angle to provide a tapered lead-in end, not shown, to accomplish the threading of this end of the tube through the holes 12 and 15. In the tight fit example, the nominal external diameter of the tube would be less than the internal diameters of the holes 12 and 15 and could be threaded as is, that is, without the need of a tapered lead-in end.

Figure 2:
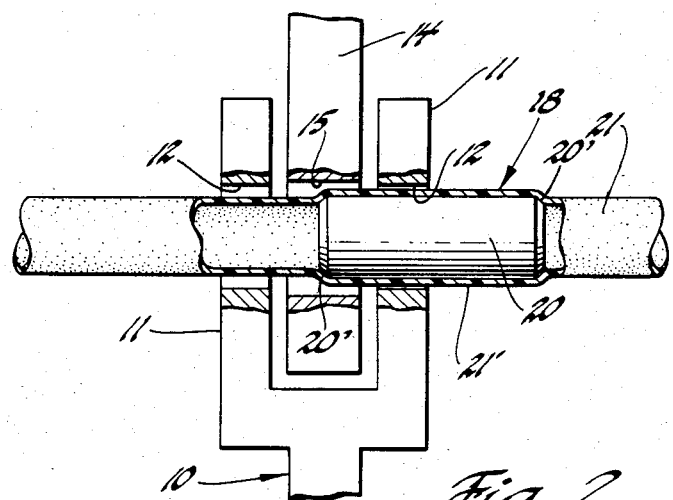
Figure 3:
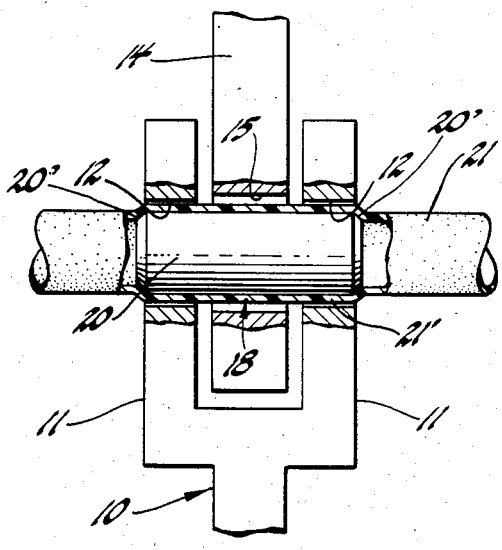

The pin 20 and tube 21 arrangement is such so that when the tube 21 is pulled in tension by an assembler, as by his hands or with pliers, whereby to effect elongation of the tube, the combined pin 20 and tube external diameter is less than the internal diameter of the associate holes, such as holes 12 and 15 in the arms 11 and lever 14, respectively. This desired external diameter can be reached by elongating the tube 21 without, of course, exceeding the elastic limit of the tube 21 material. Thus as shown in FIG. 1, the lead-in end, not shown, of the tube 21, the left hand end with reference to FIGS. 1-3, can be threaded through the axially aligned holes 12 and 15, after which, while still maintaining tension on the tube 21, the pin 20 and the tube portion 21' can be drawn through the holes 12 and 15 in the sequence of steps shown in FIGS. 2 and 3 until the pin 20 and tube portion 21' are axially positioned as shown in FIG. 3.

Thereafter, the tension forces on the tube 21 is released, which then allows the tube, in its now relaxed state, to return to its nominal condition thus permitting the tube to expand radially outward toward its nominal external diameter which thus causes a radial force to be applied by the tube portion 21' against the internal walls defining the holes 12 in the arms 11 in the construction illustrated whereby to axially fix the pin 20 and tube portion 21' in the arms 11 of the support member 10. The assembler can then cut off opposite ends of the tube 20 next adjacent to opposite ends of the pin 20 so that the plastic covered fastening device of the invention will appear as shown in FIG. 4 and will include the pin 20 encircled by the tube portion 21' in the construction shown.

Of course it should be appreciated that if the pin 20 and tube 21 are to be hand assembled to a pair of elements, the material of the tube 21 and the wall thickness thereof should be preselected so as to permit an assembler to apply the necessary axial tension force on the tube to cause elongation thereof whereby to reduce its external diameter as required to effect assembly of the pin and tube in the apertures of the elements to be assembled together.

Thus, by way of an example, in a first application, a pin 20 of stainless steel and a tube 21 made of Teflon was used to pivotably secure a plastic earpiece to the metal temple of a pair of glasses. Prior to the use of the subject plastic covered fastening device, the hole through the plastic earpiece and the metal temple had become enlarged from normal usage, so that the convention metal pin had fallen out. In this application, the holes 12 in the metal temple were of 0.051 inch internal diameter while the hole 15 in the plastic earpiece was of a suitable larger internal diameter. The pin 20, used in this application, had a 0.0358 inch external diameter, while the tube 21 of Teflon, in its released or nominal form had a 0.048 inch external diameter and a 0.025 internal diameter.

In a second application, a wood element was fixed to an aluminum workpiece in a vibration environment on a hand saw by the use of a tubular steel pin 20 and a latex rubber tube 21 of the type commonly referred to as surgical tubing in the medical profession. In this application, both the wood element and the aluminum workpiece were provided with coaxial holes each of 0.30 inch internal diameter. For this purpose, the tubular pin 20 had an external diameter of 0.250 inch and the surgical tubing 21 in its released or normal condition had a 0.335 inch nominal external diameter and a nominal 0.185 internal diameter.

It should now be appreciated that the subject invention relates to a fastening device and method for fastening or pinning one object to another. The fastening device, in accordance with the invention makes use of the radial forces present when axial tension on a plastic material, such as a plastic tube, is released. The plastic tube, with a pin previously inserted therein is stretched by axial tension during installation, thereby reducing its nominal external diameter.

The type and thickness of the plastic tubing will depend on the materials to be fastened and the forces that will be applied on the joint during use. The pin can be made of any rigid metal or non-metal material.

The subject plastic coated fastening device and method has particular application for fastening plastic parts or metal parts with high temperature expansion coefficients. Of the plastic material examples described, tubing of Teflon or Delrin are particular good tubing material for use in working joints as in the structure illustrated, while a tubing of PVC or a latex rubber or plastic material would be of use in wood and in non-working metal fastenings.

Of course some design parameters in the selection of suitable plastic material for the tubing are:

1. The desired radial force of the tubing is exerted when the tubing is in the relaxed state, that is, when no axial tension is applied to the tubing; and, 2. The desired external diameter of the tubing surrounding the pin can be obtained by elongation of the tube without exceeding the elastic limit of the tube material.

While the invention has been described with reference to the particular embodiment and applications disclosed herein, it is not confined to the details set forth since it is apparent that various modifications can be made by those skilled in the art without departing from the scope of the invention. This application is therefore intended to cover such modifications or changes as may come within the purposes of the invention as defined by the following claims.

The embodiments of the invention in which an exclusive property or privilege is claimed are defined as follows:

1. A method for securing a first element with at least one aperture therein of a predetermined internal diameter to a second element with at least one aperture therein of predetermined internal diameter located coaxial with said aperture in said first element by means of a plastic coated fastening device including the steps of inserting a rigid pin into a tube of resilient, plastic material of a predetermined nominal exterior diameter; applying an axial tension force to said tube whereby to reduce the effective external diameter of the combined pin and tube to a size less than that of the apertures; threading an end of said tube through said coaxial apertures; then, while still applying the axial tension force, axially moving said tube and said pin until said pin and the pin encircling portion of said tube are located in said apertures; releasing the tension force on said tube whereby said pin encircling portion of said tube can then expand radially outward to effect axial securement of said pin relative to at least said one aperture in said first element; and, trimming said tube adjacent to opposite ends of said pin.

2. A method according to claim 1, wherein said first element includes a clevis with a pair of spaced apart arms each having an aperture of predetermined internal diameter and said second element is a lever with an aperture of a predetermined internal diameter greater than said internal diameter of said apertures in said clevis located between said arms, and wherein the resilient, plastic material of said tube is Teflon and which when radially expanded effects securement of said pin in said apertures of said clevis while allowing pivotal movement of said lever.

3. A method according to claim 1, wherein said first element includes a clevis with a pair of spaced apart arms each having an aperture of predetermined internal diameter and said second element is a lever with an aperture of a predetermined internal diameter greater than said internal diameter of said apertures in said clevis located between said arms, and wherein the resilient, plastic material of said tube is Delrin and which when radially expanded effects securement of said pin in said apertures of said clevis while allowing pivotal movement of said lever.

4. A method according to claim 1 wherein the resilient material of said tube is latex rubber material.

5. A method according to claim 1 wherein the resilient material of said tube is a polyvinyl chloride.

* * * * *